United States Patent
Bennett

(10) Patent No.: US 7,303,382 B1
(45) Date of Patent: Dec. 4, 2007

(54) COIL BRIDGE CONVEYOR

(75) Inventor: Jefferey W. Bennett, Nashville, TN (US)

(73) Assignee: Bennett Tool & Die Co., Inc., Nashville, TN (US)

( * ) Notice: Subject to any disclaimer, the term of this patent is extended or adjusted under 35 U.S.C. 154(b) by 193 days.

(21) Appl. No.: 11/080,197

(22) Filed: Mar. 15, 2005

Related U.S. Application Data

(60) Provisional application No. 60/560,653, filed on Apr. 8, 2004.

(51) Int. Cl.
*B65G 37/00* (2006.01)
*B29C 69/02* (2006.01)

(52) U.S. Cl. ...................... 425/145; 198/300
(58) Field of Classification Search ............... 425/317, 425/145; 198/300
See application file for complete search history.

(56) References Cited

U.S. PATENT DOCUMENTS

| | | | | |
|---|---|---|---|---|
| 2,588,595 A | * | 3/1952 | Warner ...................... 425/110 |
| 2,948,093 A | * | 8/1960 | Bonami ........................ 53/448 |
| 3,065,584 A | * | 11/1962 | Coleman ..................... 53/122 |
| 3,523,603 A | * | 8/1970 | Fuller et al. ............... 198/468.4 |
| 3,659,993 A | * | 5/1972 | Brown, Jr. .................. 425/214 |
| 4,039,088 A | * | 8/1977 | Marynissen .............. 198/468.3 |
| 4,139,089 A | | 2/1979 | Jensen ......................... 198/621 |
| 4,158,534 A | * | 6/1979 | Hegler et al. ................ 425/142 |
| 4,166,528 A | * | 9/1979 | Renner ........................ 198/825 |
| 4,370,921 A | * | 2/1983 | Moller et al. .................. 99/405 |
| 4,634,483 A | * | 1/1987 | Spengler ..................... 156/216 |
| 5,044,490 A | | 9/1991 | East ............................. 198/830 |
| 5,131,256 A | * | 7/1992 | Sofy ........................ 72/405.13 |
| 5,813,513 A | | 9/1998 | Taube .......................... 198/803 |
| 5,992,209 A | * | 11/1999 | Hofele et al. ............... 72/405.1 |
| 6,186,318 B1 | | 2/2001 | Pax et al. .................... 198/841 |
| 6,516,942 B2 | | 2/2003 | East ............................. 198/830 |
| 6,695,132 B2 | * | 2/2004 | Cook et al. .............. 198/832.1 |

OTHER PUBLICATIONS

Manual (May 2002) (99037)—Best Diversified Products, Inc.—Best/Flex Gravity Expandable Conveyor—B/F 200 & B/F 300 Series.

* cited by examiner

*Primary Examiner*—Yogendra N. Gupta
*Assistant Examiner*—Dimple N. Bodawala
(74) *Attorney, Agent, or Firm*—Waddey & Patterson, P.C.; Phillip E. Walker

(57) ABSTRACT

A conveying apparatus for directing material into a die. The die includes a material opening to accept the material from a material feed system and is positioned in a press. The conveying system comprises a frame, including a front stanchion, a rear stanchion, a first side, and a second side. The first side is spaced a first distance from the second side and the front stanchion is spaced a second distance from the rear stanchion. A plurality of horizontal supports is operatively attached to first and second sides and spans the first distance. A plurality of horizontally expanding cross members is also included wherein each cross member supports one of the horizontal supports and is operatively connected to adjacent cross members. The cross members are positioned to vary the second distance. A vertical displacement device is operatively attached to the plurality of horizontal supports to vertically position the plurality of horizontal supports to direct the material to the material opening of the die.

19 Claims, 5 Drawing Sheets

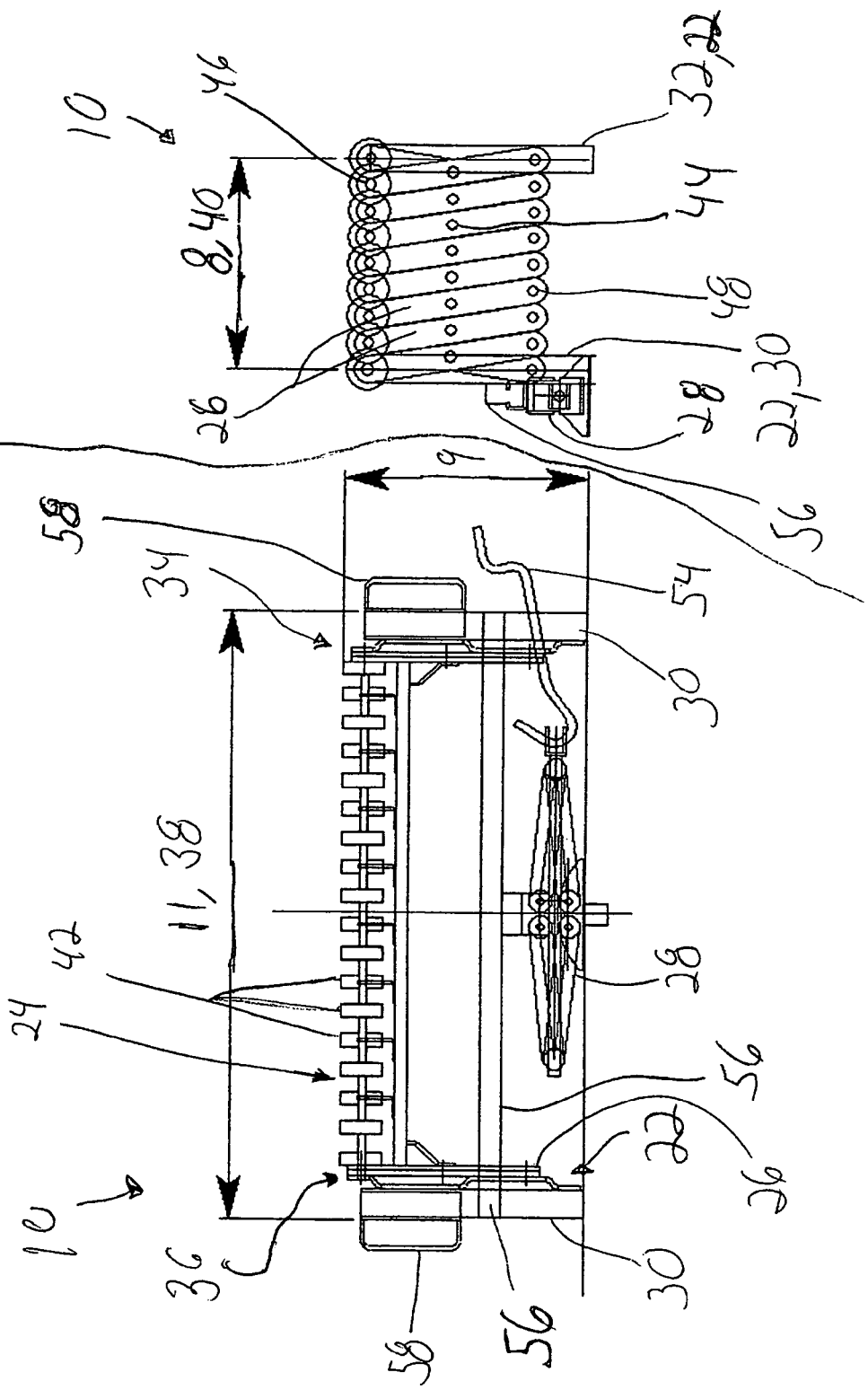

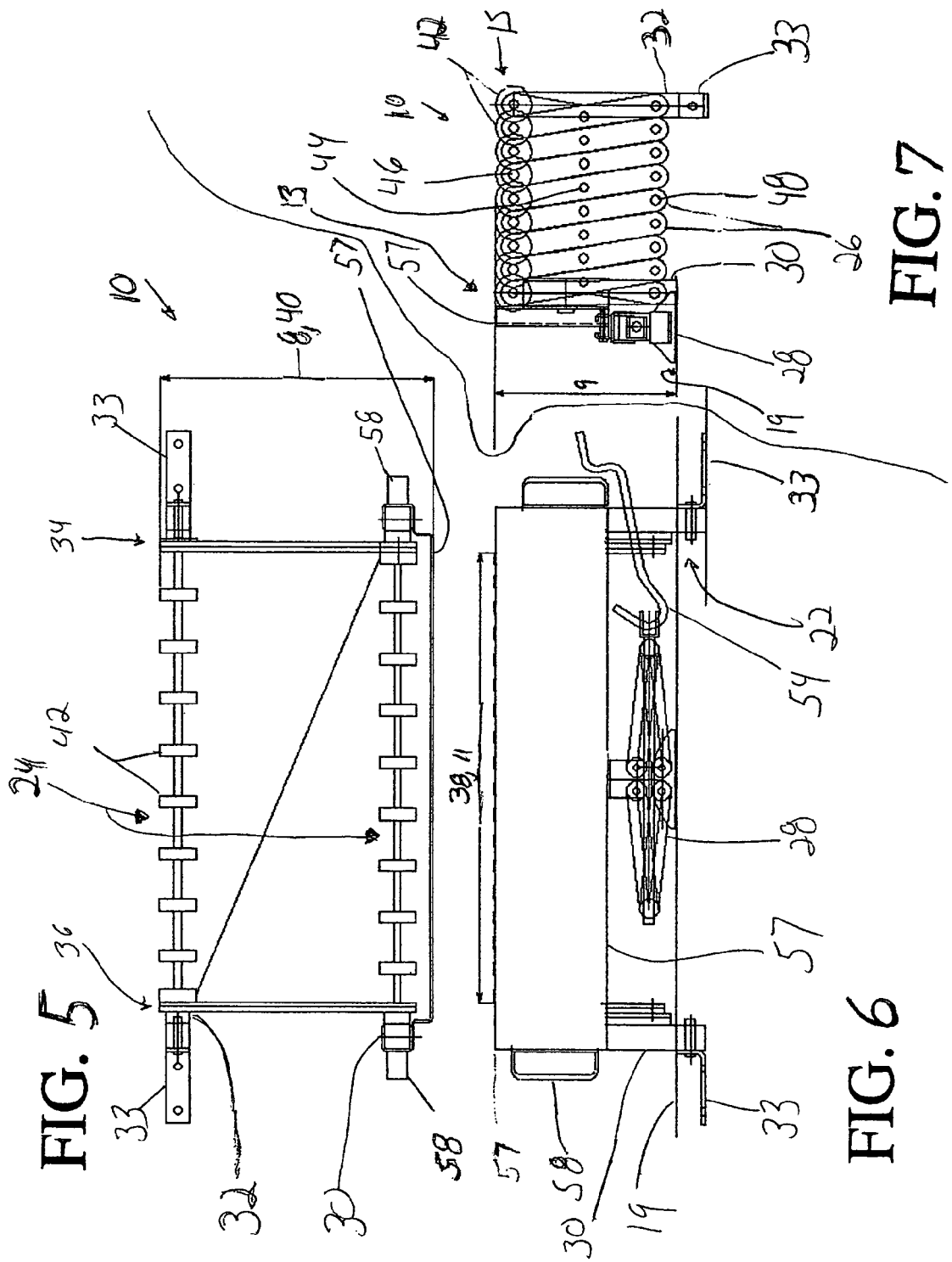

COIL BRIDGE CONVEYOR

CROSS-REFERENCES TO RELATED APPLICATIONS

This application a claims benefit of co-pending U.S. Patent Application Ser. No. 60/560,653 filed Apr. 8, 2004, entitled "Coil Bridge Conveyor", which is hereby incorporated by reference.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyrights whatsoever.

All patent and publications described or discussed herein are hereby incorporated by reference in their entirety.

BACKGROUND OF THE INVENTION

The present invention relates generally to adjustable conveying systems. More specifically, the present invention relates to an expanding conveyor system used to direct rolls of material from a material supplying system into a stamping die positioned within a press machine for the forming of parts from the roll of material.

The current improvement to a conveying apparatus enhances the delivery of material from the material feed system, which is used to feed rolls of material, into an opening of a die, wherein the die is positioned within a press and is used to produce product from the roll of material.

It will be appreciated by those skilled in the art that conveying systems have existed for many years. However, most of these conventional conveying systems are for handling individual elements, such as packages, and transporting those individual elements from one location to the next. Alternately, these conventional conveying systems are not designed to maintain the elements or materials supplied in a flat nature. For example, U.S. Pat. Nos. 4,139,089, 5,044,490, 5,813,513, 6,186,318, and 6,516,942 all disclose such conventional conveying devices.

Additionally, these conventional conveying devices normally lack the ability to vertically vary the location at which the elements transported on the conveying systems are supplied. Also, these conventional conveying systems are not easily horizontally adjustable to accommodate the variances and distances between the material feed system and the dies positioned in the metal presses. This distance can vary greatly depending on the specific material feed system used, the metal stamping machine used, and the size and configuration of the die used to process the material. Additionally, depending on the size of the die used to process the material, the material supplied to that die will need to vary in height. As a result, a conveying apparatus used to supply the material will need to have both vertically and horizontally variable ranges from which the material feeds into the die.

As such, what is lacking in the art is a conveying apparatus that can horizontally and vertically vary its support for an elongated strip of material as that material is fed from a material feed system into a die positioned in a mechanical press.

BRIEF SUMMARY OF THE INVENTION

Disclosed herein is a conveying apparatus for directing material into a die. The die includes a material opening to accept the material from a material feed system and is positioned in a press. The conveying system comprises a frame, including a front stanchion, a rear stanchion, a first side, and a second side. The first side is spaced a first distance from the second side and the front stanchion is spaced a second distance from the rear stanchion. A plurality of horizontal supports is operatively attached to first and second sides and spans the first distance. A plurality of horizontally expanding cross members is also included wherein each cross member supports one of the horizontal supports and is operatively connected to adjacent cross members. The cross members are positioned to vary the second distance. A vertical displacement device is operatively attached to the plurality of horizontal supports to vertically position the plurality of horizontal supports to direct the material to the material opening of the die.

In a preferred embodiment, the plurality of horizontal expanding cross members span the second distance between the front stanchion and the rear stanchion. Additionally, the vertical displacement device and the front stanchion are shaped to be positioned within the press, while the rear stanchion is shaped to be positioned on the material feed system. The plurality of horizontal supports includes friction reducing guides.

Each cross member is attached to one of the horizontal supports at a first attachment point and is attached to at least one other cross member at a second attachment point. Also, each cross member is further attached to a third cross member at a third attachment point. The interaction between the cross members allows for a horizontal expansion of the conveying apparatus to support the material substantially over the distance between the material feed system and the opening of the die.

As such, it is an object of the present invention to provide a conveying apparatus for directing material into a die wherein the die is positioned in a press.

Another object of the present invention is to provide a conveying apparatus that can horizontally vary in length in order to support material transported from a material feed system to a die position in a mechanical press.

Yet another object of the present invention is to provide a conveying apparatus including a plurality of horizontally expanding cross members cross-linked at various locations along the length of each cross member in order to support material being transferred from a material feed system to a die.

And yet another object of the present invention is to provide a conveying apparatus that can vary in vertical height on at least one end in order to vary the supply of material into a die positioned in a mechanical press.

Still another object of the present invention is to provide a conveying apparatus specifically designed to interact with a material feed system and a die positioned within a mechanical press and conform its elements to that interaction.

Other and further objects features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 3 is a front view of an embodiment of a conveying apparatus made in accordance with the current invention.

FIG. 4 is a side view of the embodiment of the conveying apparatus shown in FIG. 3.

FIG. 5 is a top view of an alternate embodiment of a conveying apparatus made in accordance with the current invention.

FIG. 6 is a front view of the conveying apparatus shown in FIG. 5 pictured with the vertical displacement device.

FIG. 7 is a side view of the conveying apparatus shown in FIG. 6.

DETAILED DESCRIPTION OF THE INVENTION

Figure 1:
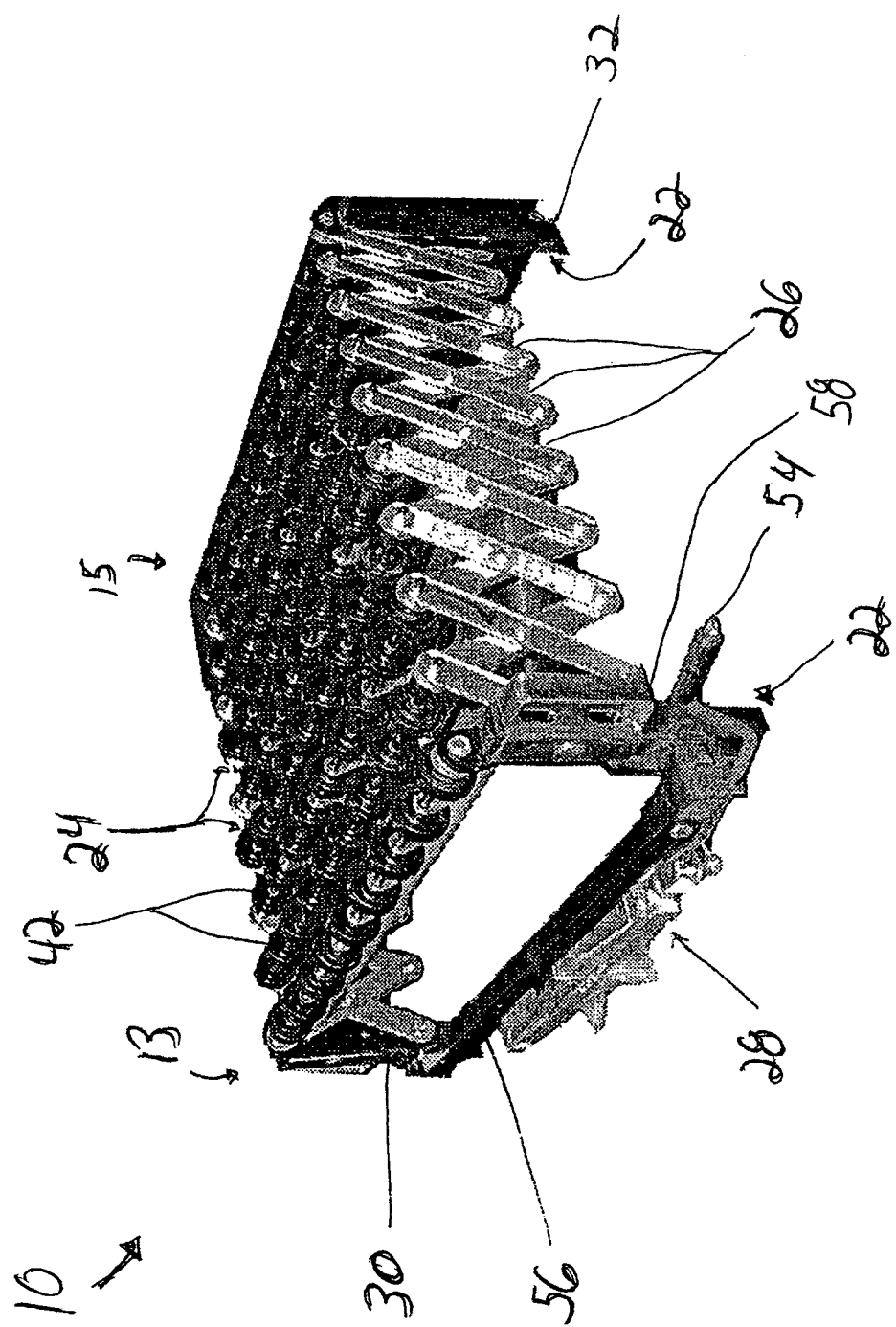
FIG. 1 is a perspective view of an embodiment of a conveying apparatus made in accordance with the current invention.

Referring generally to FIGS. 1-7, the conveying apparatus is shown and generally designated by the numeral 10. The conveying apparatus (10) is a conveying apparatus for directing material (12) from a material feed system (14) to a die (16). The die (16) includes a material opening (18) and is positioned in a press (20). The press can be any press known in the art to produce a product through the application of a force to a material (12). For example, the press (20) can be a printing press, a mechanical press, a hydraulic press, and electrical press, and the like. Preferably, the die (16) is positioned within a mechanical press (20) and is used to stamp specifically shaped elements out of the roll of material (12).

The conveying apparatus (10), which can be described as a coil bridge conveyor (10), spans a gap between the material feed system (14) and the die (16). The novel conveying apparatus (10) prevents the use of makeshift supports and prevents material (12) sagging and buckling. The length (8) of the conveying apparatus (10) as well as the height (9) can vary greatly and is adjustable to fit numerous die setups. When the apparatus (10) is in the compressed position it can easily store within the mechanical press (20) to facilitate proper dies (16) set up within the material press (20).

The material (12) is delivered from a coil of material and is straightened by the material feed system (14) and supplied to a die (16). The material (12) is substantially supported by the conveying apparatus (10) from the material feed system (14) to the die (16).

Preferably the conveying apparatus (10) is horizontally expandable in a one-to-four ratio. Other expansion ratios can be designed into the conveying apparatus (10) and still maintain the inventive nature of the novel conveying apparatus (10).

The conveying apparatus (10) includes a frame (22), a plurality of horizontal supports (24) attached to the frame (22), a plurality of horizontally expanding cross members (26), and a vertical displacement device (28). Additionally, the conveying apparatus (10) can include handles (58) used to facilitate movement and positioning of the conveying apparatus (10).

The frame (22) includes at least one front stanchion (30), at least one rear stanchion (32), a first side (34), and a second side (36). The first side (34) is spaced a first distance (38) from the second side (36) while the front stanchion (30) is spaced a second distance (40) from the rear stanchion (32). Additionally, the horizontally expanding cross members (26) operatively connect the front stanchion (30) to the rear stanchion (32).

The horizontal supports (24) are operatively attached to the first side (34) and the second side (36) and span the first distance (38) between the first side (34) and second side (36). The horizontal supports (24) can also be described as substantially spanning the width (11) of the conveying apparatus (10). Additionally, each horizontal support (24) is spaced from the adjacent horizontal supports (24). This spacing between the horizontal supports (24) can vary according to the operation of the horizontal expanding cross members (26) as will be described below.

The horizontal supports (24) also include friction reducing members (42). The friction reducing members (42) are designed to support and guide the material (12) to the die (16). The friction reducing members (42) can span the entire width of the horizontal supports (24) or can sequentially vary along the width of the horizontal supports. Additionally, the spacing of the friction reducing members (42) can vary between adjacent horizontal supports (24).

The friction reducing members (42), which can also be described as friction reducing guides (42), are preferably wheel type supports, such as steel wheels as known in the art. Alternately, the friction reducing members can be heavy duty, non-marking, precision bearing poly rollers positioned on axles for durability and frictionless feeding of the material (12) to the die (16). However, the friction reducing members (42) can be other types of friction reducing supports known in the art to linearly facilitate the movement of material. For example, the friction reducing members can be rollers, casters, drum disks, and other like elements.

Each cross member (26) supports at least one of the horizontal supports (24) and is positioned to vary the spacing, or second distance (40), between the horizontal supports (24). Each cross member (26) is operatively connected to adjacent cross members (26), wherein the cross members (26) are positioned to rotate about a center point (44). This rotation about the center point (44) and the adjacent attachment between expanding cross members (26) facilitates the horizontal expansion of the conveying apparatus (10). More specifically, this horizontal expansion can be described as increasing the spacing between the horizontal supports (24) or increasing the second distance (40) between the front stanchion (30) and rear stanchion (32).

Each cross member (26) is attached to one of the horizontal supports (24) at a first attachment point (46) and is attached to another cross member (26) at a second attachment point (48). Additionally, each cross member (26) is attached to an additional cross member (26) at a third attachment point (44), which can also be described as a center point (44).

Collectively, the cross members (26) and the attachments of the cross members (26) at points (46), (48), and (44) align the cross members (26) to span the second distance (40) between the first stanchion (30) and rear stanchion (32) and can vary the second distance (40) through their rotation about the center point (44). This can be described as having an accordion style movement, or appearance.

The vertical displacement device (28) is operatively attached to the horizontal supports (24) to vertically position the horizontal supports (24) to direct the material (12) to the die (16). More specifically, the vertical displacement device (28) is attached to the front stanchion (30) of the frame (22) to vertically vary the front of the conveying apparatus (10). This vertical variance will direct material (12) to the material opening (18) of the die (16) positioned in the mechanical press (20).

The vertical displacement device (28) can also be described as being positioned to vertically align, or vertically position, the front stanchion (30) with respect to the material opening (18) of the die (16). This movement vertically positions the front stanchion (30), the material (12), and the front (13) of the conveying apparatus (10) with respect to the die (16) and the mechanical press (20). The vertical displacement device (20) can vary the height (9) of the front (13) of the conveying apparatus (10) when that height (9) is measured from the die support surface (19) of the mechanical press (20).

Figure 2:
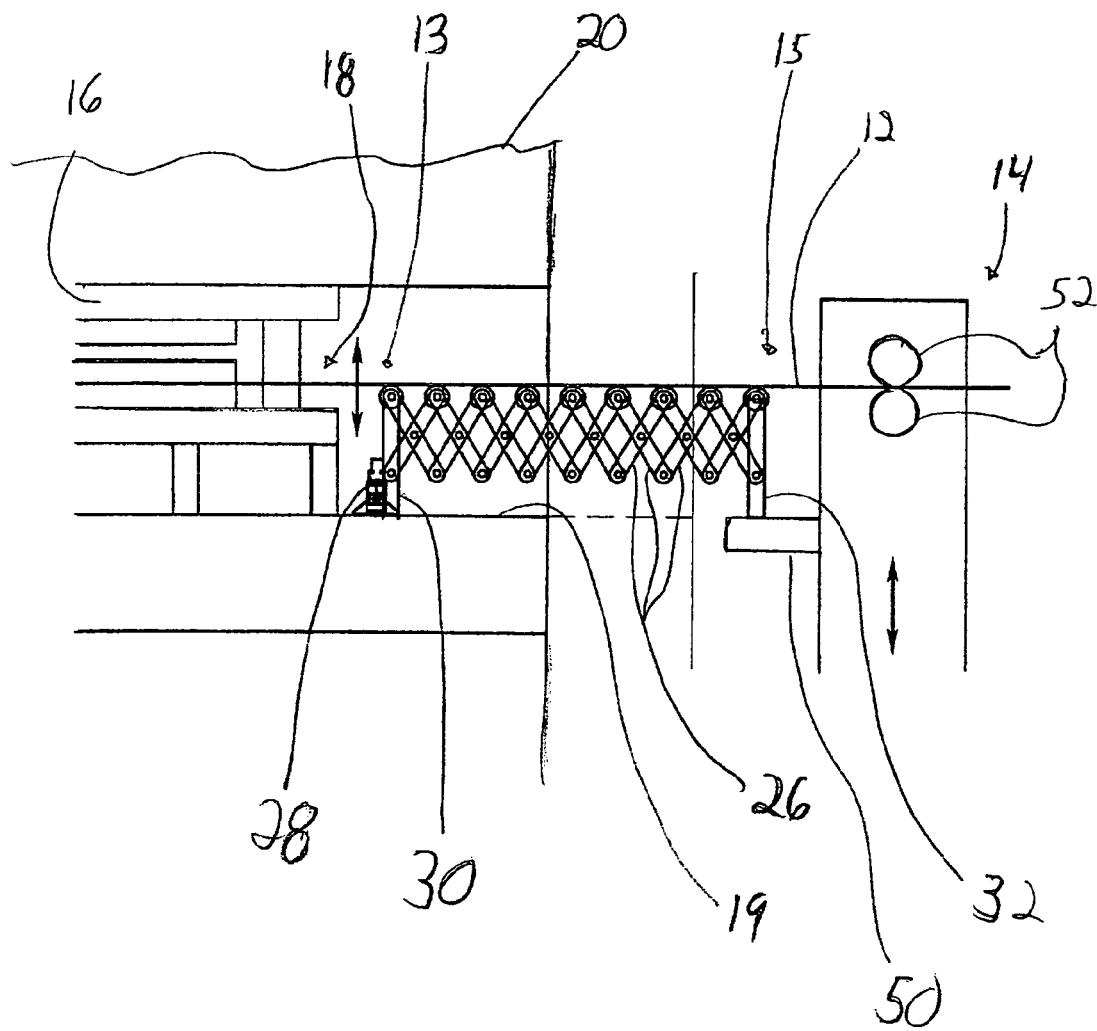
FIG. 2 is a schematic side view showing the interaction between a conveying apparatus, a material feed system, mechanical press, and a stamping die.
Figure 8:
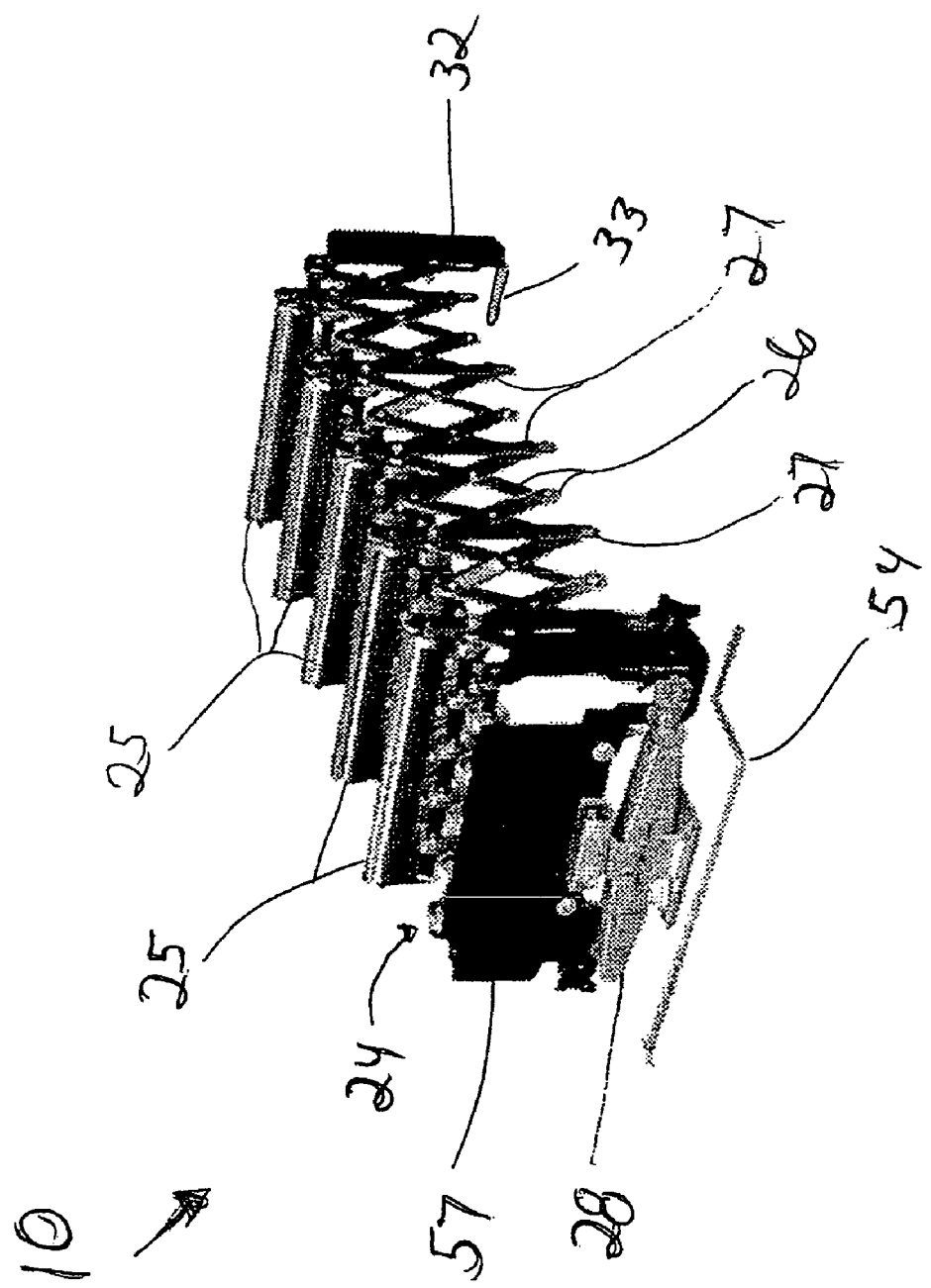
FIG. 8 is a perspective view of an alternate embodiment shown with top supports positioned above and spaced from the horizontal supports to limit the vertical movement of the material.

Facilitating this vertical displacement is the fact that the front stanchion (30) and the vertical displacement device (28) are shaped to be positioned within the mechanical press (20), as schematically shown in FIG. 2. The front stanchion (30) and vertical displacement device (28) are also shaped to refrain from interaction with the die (16) during the operation of the die (16) and mechanical press (20). This in turn facilitates a better operation of the mechanical press (20) and the die (16) to produce the elements for which the die (16) are designed to produce.

The rear stanchion (32) is shaped to be positioned on a material feed system (14). Normally the material feed system (14) will be vertically variable. As such the rear stanchion (32) can include rotatable connections (33), which can also be described as attachment brackets (33), designed to attach the rear stanchion (32) to an armature (50) of the material feed system (14). The rotatable connection (33) can be attached to the rear stanchion (32) and the armature (50) to allow independent movement of the rear stanchion (32) with respect to the front stanchion (30). This independent movement facilitates the vertical adjustment of the conveying apparatus (10) to feed the material (12) to the press (20).

The material feed system (14) includes material feed guides (52) designed to feed the roll of material (12) into the die (16). As the material (12) is fed through the material feed guides (52), the back (15) of the conveying apparatus (10) supports the material (12) and begins to direct the material (12) to the die (16). The material feed guides (52) can be rollers, sliding elements, or other elements known in the art to straighten and feed the roll of material (12) into the die (16).

The rear stanchion (32) facilitates the height of the back (15) which includes a horizontal support (24) that includes friction reducing guides (42). Alternatively, the back (15) of the conveying apparatus (10) can include a rear vertical displacement device used to vary the height of the back (15) in relation to the material feed system (14).

In a preferred embodiment, the vertical displacement device (28) is a jack. The jack includes a hand crank (54) used to raise and lower the jack. The jack (28) is attached to a front brace (56) that substantially spans the width (11) of the conveying apparatus (10). The front brace (56) is operatively attached to the front stanchion (30) and is used to even the vertical displacement between the first side (34) and second side (36). The front brace (56) can be a bar type front brace or other braces known in the art to attach to two stanchions to equally displace two stanchions from a central upward force.

Also include is a protective plate (57) positioned proximate to the front brace (56) and front stanchion (30). The protective plate (57) includes a top edge positioned approximately even with the top of the friction reducing members (42), as seen in FIGS. 6 and 7. Preferably, the top edge of the protective plate (57) is positioned just below the top of the friction reducing members (42). This positioning provides protection for the friction reducing members (42) from the material (12) as the material (12) is fed into the die (16). During the operation of some types of presses, the material (12) can be pulled downward. The protective plate (57) keeps the material (12) from damaging the friction reducing members (42) when the material is pulled down by these types of presses. The protective plate (57) can span a portion of or the entire width (11) of the conveying apparatus (10). Additionally, the protective plate (57) can also protect the conveying apparatus (10) from mechanical failure of the surrounding die (16) and press (20), as well as protect the conveying apparatus (10) from shards of material (12) created during operation of the press (20).

In an alternate embodiment, the conveying apparatus (10) includes top supports (25) positioned above and spaced from the horizontal supports (24) to limit the vertical movement of the material (12). The top supports (25) can be attached to top support stanchions (27) which can be used to space the top supports (25) above the horizontal supports (24). The top supports (25) restrict the upward movement of the material (12) as the material (12) is fed from the material feed system (14) to a die (16). The top supports (25) can also be described as preventing buckling of the material (12). The top supports (25) can span a portion of width (11) of the conveying apparatus (10). Preferably, the top supports (25) span the entire width (11) of the conveying apparatus (10).

Thus, although there have been described particular embodiments of the present invention of a new and useful Coil Bridge Conveyor, it is not intended that such references be construed as limitations upon the scope of this invention except as set forth in the following claims.

What is claimed is:

1. A conveying apparatus for directing material to a die positioned in a mechanical press, the conveying system comprising:
   a frame;
   a plurality of horizontal supports attached to the frame, each horizontal support spaced from the adjacent horizontal support and positioned to support the material;
   a plurality of horizontally expanding cross members, each cross member supporting at least one of the horizontal supports and positioned to vary the spacing between the horizontal supports; and
   a vertical displacement device operatively attached to the plurality of horizontal supports to vertically position the plurality of horizontal supports to direct the material to the die.

2. The conveying apparatus of claim 1, wherein the frame further includes at least one front stanchion and at least one rear stanchion, the at least one front stanchion space from the at least one rear stanchion, wherein the plurality of horizontally expanding cross members operatively connect the at least one front stanchion and the at least one rear stanchion.

3. The conveying apparatus of claim 2, wherein the vertical displacement device is operatively attached to the at least one front stanchion and positioned to vertically position the at least one front stanchion with respect to the die.

4. The conveying apparatus of claim 3, wherein the vertical displacement device vertically positions the material with respect to the die.

5. The conveying apparatus of claim 2, wherein the frame further includes a first side spaced from a second side and the plurality of horizontal supports span the distance between the first side and the second side.

6. The conveying apparatus of claim 2, wherein the at least one rear stanchion includes a rotatable connection positioned to allow independent vertical movement of the at least one rear stanchion with respect to the at least one front stanchion.

7. The conveying apparatus of claim 1, wherein the plurality of horizontal supports includes friction reducing members.

8. The conveying apparatus of claim 1, further including top supports positioned above and spaced from the horizontal supports to limit the vertical movement of the material.

9. The conveying apparatus of claim 1, wherein each cross member is attached to one of the horizontal supports at a first attachment point and is attached to at least one other cross member at a second attachment point.

10. A conveying apparatus for directing material from a material feed system to a die, the die having a material opening and positioned in a mechanical press, the conveying system comprising:
a frame including at least one front stanchion, at least one rear stanchion, a first side, and a second side, wherein the first side is spaced a first distance from the second side and the at least one front stanchion is space a second distance from the at least one rear stanchion and;
a plurality of horizontal supports operatively attached to the first and second side and spanning the first distance;
a plurality of horizontally expanding cross members, each cross member supporting at least one of the horizontal supports and operatively connected to adjacent cross members, wherein the cross members are positioned to vary the second distance; and
a vertical displacement device operatively attached to the plurality of horizontal supports to vertically position the plurality of horizontal supports to direct the material to the material opening of the die.

11. The conveying apparatus of claim 10, wherein the plurality of horizontally expanding cross members span the second distance.

12. The conveying apparatus of claim 10, wherein the vertical displacement device and the at least one front stanchion are shaped to be positioned within the mechanical press.

13. The conveying apparatus of claim 12, wherein the at least one rear stanchion is shaped to be positioned on the material feed system.

14. The conveying apparatus of claim 10, wherein the plurality of horizontal supports includes friction reducing guides.

15. The conveying apparatus of claim 14, wherein each one of the plurality of cross members are attached to one of the horizontal supports at a first attachment point and is attached to at least one other cross member at a second attachment point.

16. The conveying apparatus of claim 15, wherein each cross member is further attached to a cross member at a third attachment point.

17. A conveying apparatus for directing material from a material feed system to a die, the die having a material opening and positioned in a mechanical press, the conveying system comprising:
a frame including at least one front stanchion, at least one rear stanchion, a first side, and a second side, wherein the first side is spaced a first distance from the second side and the at least one front stanchion is space a second distance from the at least one rear stanchion and;
a plurality of horizontal supports operatively attached to the first and second side and spanning the first distance, each horizontal support including friction reducing guides;
a plurality of horizontally expanding cross members, each cross member supporting at least one of the horizontal supports at a first attachment point and operatively connected to adjacent cross members at second and third attachment points, wherein collectively the cross members span the second distance and are positioned to vary the second distance; and
a vertical displacement device operatively attached to the plurality of horizontal supports to vertically position the plurality of horizontal supports to direct the material to the material opening of the die.

18. The conveying apparatus of claim 17, wherein the vertical displacement device and the at least one front stanchion are shaped to be positioned within the mechanical press.

19. The conveying apparatus of claim 18, wherein the at least one rear stanchion is shaped to be positioned on the material feed system.

* * * * *